(12) United States Patent
Yeh

(10) Patent No.: US 7,664,477 B2
(45) Date of Patent: Feb. 16, 2010

(54) COMMUNICATIONS SYSTEM USING A LOW COST OSCILLATOR AND RELATED METHOD THEREOF

(75) Inventor: Hsin-Chung Yeh, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 477 days.

(21) Appl. No.: 11/614,068

(22) Filed: Dec. 20, 2006

(65) Prior Publication Data
US 2008/0152058 A1   Jun. 26, 2008

(51) Int. Cl.
*H04B 1/26* (2006.01)
(52) U.S. Cl. ........................ 455/260; 375/356
(58) Field of Classification Search ............. 455/456.1, 455/192.1, 192.2, 255–260, 265; 375/145, 375/147, 356; 342/357.1, 357.2
See application file for complete search history.

(56) References Cited

U.S. PATENT DOCUMENTS

| 6,111,471 A | 8/2000 | Bonneau |
| 6,650,879 B1 | 11/2003 | Underbrink |
| 6,724,342 B2 | 4/2004 | Bloebaum et al. |
| 2004/0063411 A1* | 4/2004 | Goldberg et al. ......... 455/192.2 |
| 2005/0052317 A1 | 3/2005 | McBurney et al. |
| 2007/0121707 A1* | 5/2007 | Thor et al. .................. 375/147 |

FOREIGN PATENT DOCUMENTS

EP  0 182 549 A1   5/1986

* cited by examiner

*Primary Examiner*—Thanh C Le
(74) *Attorney, Agent, or Firm*—Winston Hsu

(57) ABSTRACT

A communications system includes a first oscillator for producing a first clock signal; a second oscillator for producing a second clock signal; and a secondary circuit coupled to the first oscillator and the second oscillator for determining a second oscillation frequency corresponding to a frequency of the second clock signal; the second oscillation signal being determined according to the first clock signal, the second clock signal, and a first oscillation frequency corresponding to a frequency of the first clock signal.

18 Claims, 6 Drawing Sheets

COMMUNICATIONS SYSTEM USING A LOW COST OSCILLATOR AND RELATED METHOD THEREOF

BACKGROUND OF THE INVENTION

1. Field of the Invention

The present invention relates to communications systems, more particularly, to a communications system using a low cost oscillator and related method thereof.

2. Description of the Prior Art

An area of recent technological advancement concerns communications-positioning systems. One example of this positioning technology is the global positioning system (GPS). The GPS is currently the Earth's only fully-functional satellite navigation system, comprising more than two dozen GPS satellites to broadcast precise timing signals by radio to electronic GPS receivers. These broadcasts allow GPS receivers to accurately determine their location (longitude, latitude, and altitude) in real time, day time, night time, or in any type of weather condition.

Due to the popularity and usefulness of GPS applications, they have also recently begun to be incorporated within communications devices and cellular phones as a single integrated unit. In producing a cost effective cellular phone with GPS functionality, manufacturers have begun sharing common components between the two systems in the integrated device. Particularly, the oscillator (or crystal) is commonly shared due to the high cost associated with each unit. The oscillator provides a clock signal for which circuitry of the device can operate from, and use for the transmission and receiving of signals. FIG. 1 illustrates a shared crystal system as described in the related art, wherein a single oscillator acts as a clock signal source for both a code division multiple access (CDMA) mobile telephone circuit and a GPS navigational circuit.

As illustrated in FIG. 1, a single oscillator 102 is shared between a GPS receiver 100 and CDMA cellular phone circuitry (not shown). The GPS receiver further comprises a low noise amplifier (LNA) 105 for receiving and amplifying an RF signal, mixers 110, 120, 121 and 146 for combining various signals, frequency dividers 130 and 135 for dividing an input frequency, analog to digital converters (ADC) 125 and 126, frequency synthesizer 116, loop filter 145, variable amplifier 112, GPS baseband 114, and voltage controlled oscillator (VCO) 115. Basic functionality of the GPS receiver 100 is well known to a person in the related art, and as such, a detailed description regarding its operation is omitted for brevity.

It is important to note that cellular phone broadcast frequencies differ from GPS broadcasting frequencies. Therefore, in order to share an identical oscillator between cellular phone circuitry and a GPS receiver, the frequency of the oscillator must be processed to match at least one of the components (either GPS or cellular) of the integrated device, or even possibly individually processed from an arbitrary frequency to match both.

The device illustrated in FIG. 1 utilizes an oscillator 102 whose clock signal matches a required frequency for the cellular phone circuitry, but differs from a required system clock frequency for the GPS baseband 114. The clock signal of the oscillator 102 is therefore processed in order to attain a suitable frequency for GPS circuitry application. The VCO 115 generates the GPS system clock signal Z4, whose frequency is contingent upon the voltage input from loop filter 145 further comprising the harmonic frequency oscillator 102, and synthesized signal S74 (fed-back from VCO 115).

An effective GPS receiver however, requires a highly accurate GPS system clock signal Z4 for optimal performance. Since the GPS receiver 100 utilizes a GPS system clock signal Z4 being derived from an oscillator 102 of mismatched frequency, several uncertainties inherently become involved. Also, implementation of a flexible input frequency synthesizer, as shown in FIG. 1 consumes significant power and IC space.

When a common oscillator is shared with a cellular device of a GSM network, and a positioning device (like a GPS navigations system), a different architecture is required. This architecture is used to cope with the need for changing frequencies involved with the changing of GSM base stations. FIG. 2 describes a method to compensate for the use of a single oscillator between a GSM cellular device and a GPS navigations system according to the prior art.

According to FIG. 2, at step 201, a user of a GPS receiver makes a request to receive its position. At step 202, aiding data (approximate location area, time, etc . . . ) is retrieved from either memory or external sources. At step 203, the GPS receiver is initialized to receive signal samples at the initial sampling frequency of the shared oscillator between the devices. The initial frequency adjustment is then recorded in step 204. The receiver is then turned off in step 205 (or 205a). If frequency compensation is required in step 206, the receiver then performs a complex correlation integration using different hypotheses of the frequency offset with the shared oscillator. At step 207, using the compensated integration of step 206, the receiver obtains a pseudo-range of the position of the GPS receiver.

As seen from the description above and FIG. 2, the method 200 can be time consuming and complex. Frequency compensation involves a base hypothesis and algorithm, which may still provide an under optimized resulting frequency and possible discrepancies. The GPS circuitry must also continually reference the GSM cellular circuitry in case of a switch in the baseband frequency. Furthermore, the GPS circuitry must acquire its local clock frequency through internal software using the GSM baseband frequency. This process therefore may also introduce uncertainties in obtaining an accurate GPS system clock for reasons already described above.

Another configuration described in the prior art attempts to overcome some of the deficiencies above by providing a fixed reference clock for the GPS circuitry. This helps ensure that an accurate frequency is utilized for GPS operations to ensure optimal performance while utilizing a synthesizer to generate frequencies for the GSM/CDMA circuitry. However, GSM performance is degraded due to division and synthesis required to obtain a suitable GSM clock signal. Also, phase noise requirements and frequency accuracies are typically not met using this configuration.

SUMMARY OF THE INVENTION

According to the present invention, a communication-positioning system is disclosed. The communication-positioning system includes a first oscillator for producing a first clock signal; a second oscillator for producing a second clock signal; and a secondary circuit coupled to the first oscillator and the second oscillator for determining a second oscillation frequency corresponding to a frequency of the second clock signal; the second oscillation signal being determined according to the first clock signal, the second clock signal, and a first oscillation frequency corresponding to a frequency of the first clock signal.

According to the present invention, a method for determining oscillation frequencies in a communications system is disclosed. The method comprises: producing a first clock signal utilizing a first oscillator; producing a second clock signal utilizing a second oscillator; and determining a second oscillation frequency corresponding to a frequency of the second clock signal; the second oscillation signal being determined according to the first clock signal, the second clock signal, and a first oscillation frequency corresponding to a frequency of the first clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
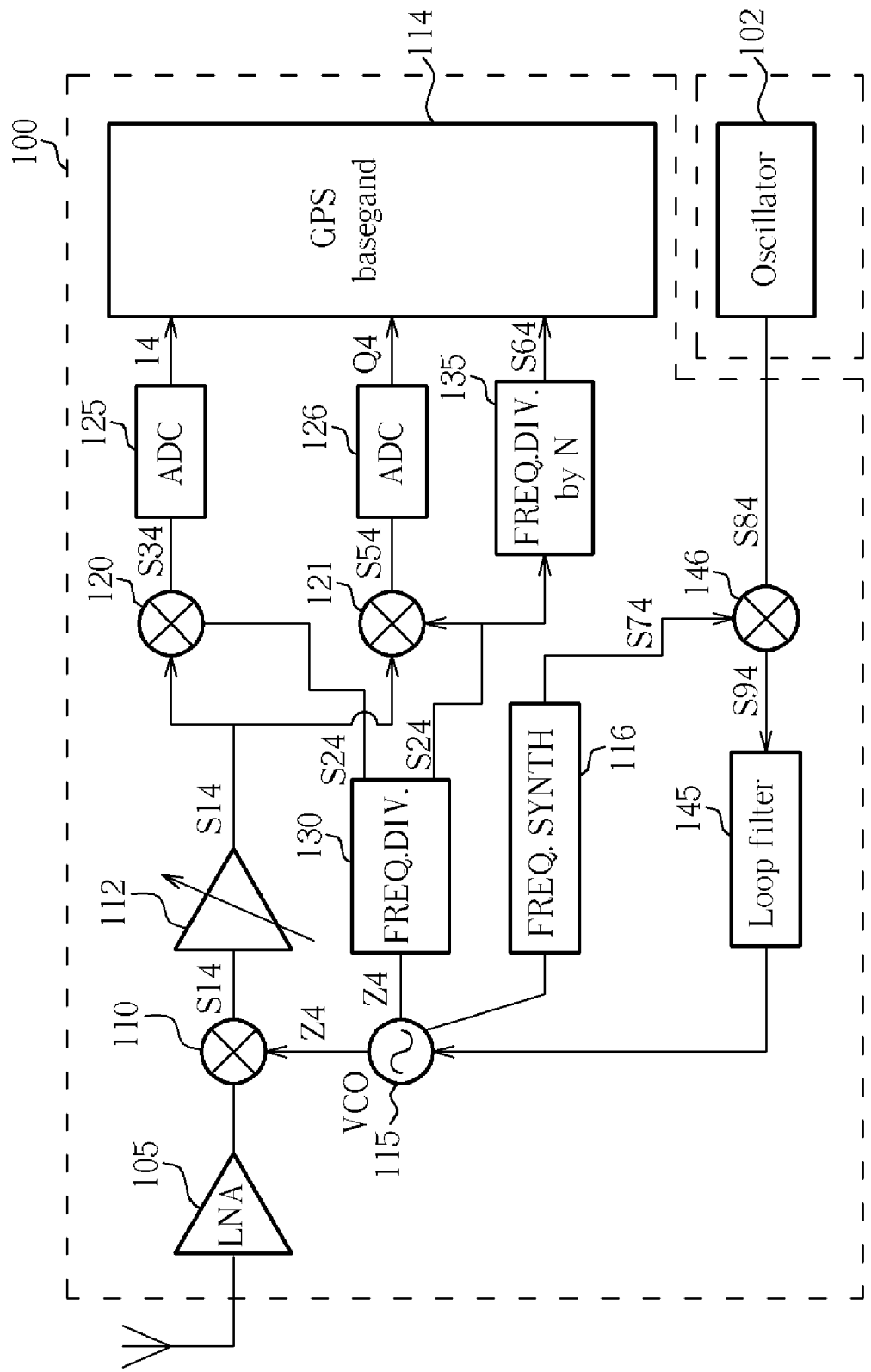
FIG. 1 illustrates a shared oscillator communication-positioning system according to the prior art.
Figure 2:
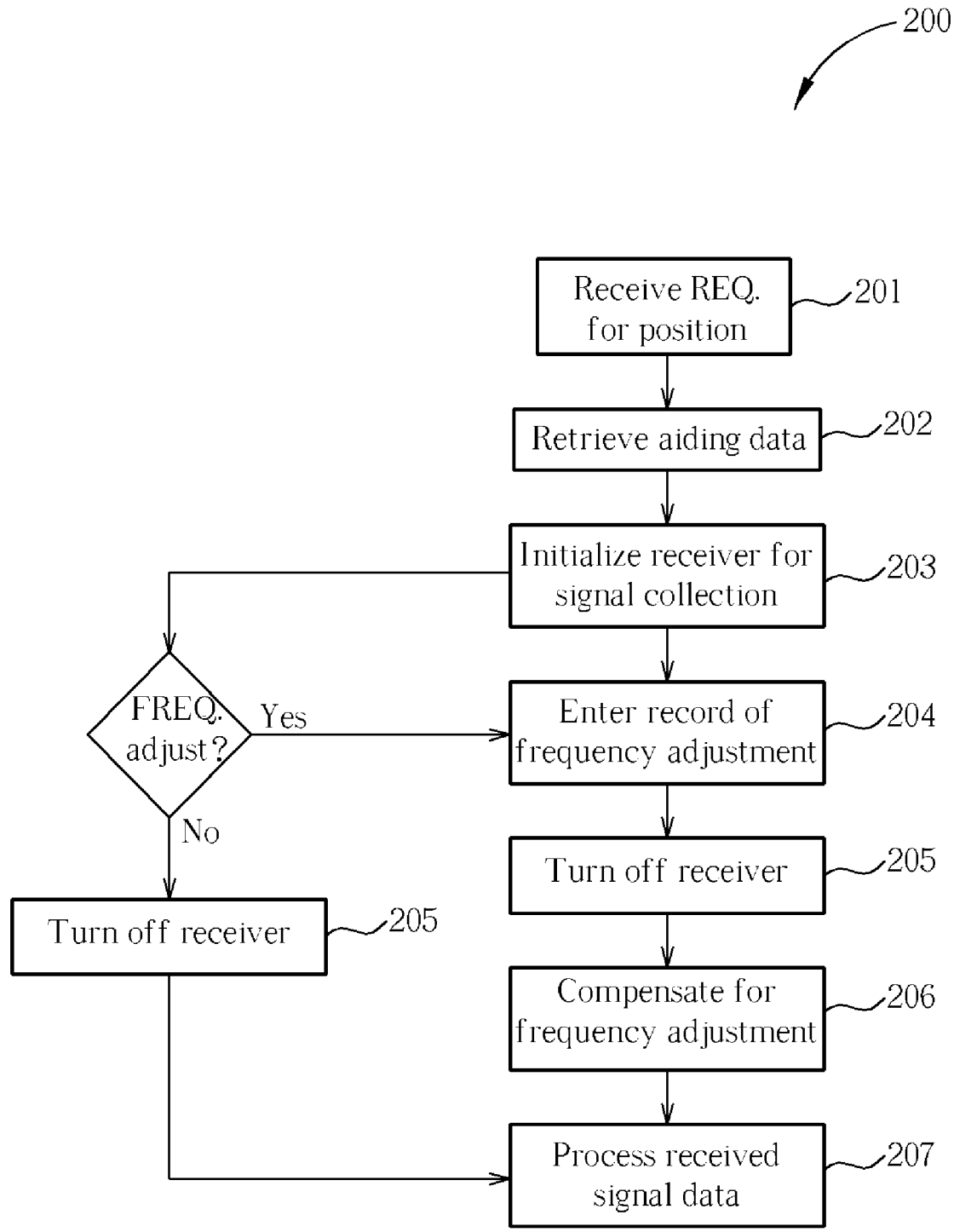
FIG. 2 illustrates a method to compensate use of a single oscillator between a cellular device and a navigations system according to the prior art.

Current methods to produce a low cost integrated GPS receiver and cellular phone present many shortcomings in obtaining optimal performance levels. When sharing a common crystal with both the GPS circuitry and cellular phone circuitry, the clock signal of the oscillator is typically fixed to one circuit while synthesized for use with the other circuit. Utilizing a synthesized clock signal however can provide many uncertainties as calibration errors and stability issues may arise. This can lead to poor performance and resolution problems for GPS tracking devices, and phase and noise degradation for mobile GSM devices.

In order to solve the above mentioned problems, the present solution provides a communications system using a low cost oscillator. This apparatus is applicable for GPS navigational circuitry in conjunction with a communications system integrated into a single unit. The communications system can be a cellular phone device with either GSM or CDMA, W-CDMA, or TDS-CDMA protocol, a Bluetooth communications device, or any wireless communications device.

Instead of using a single oscillator shared amongst the two main circuits, the present invention utilizes two individual oscillators. However, one of the oscillators is a low-cost oscillator with less predictability in terms of frequency and stability, while the other oscillator is a more accurate one. For example, a temperature-compensated oscillator with a higher frequency precision can be used. The use of one low cost oscillator helps reduce overall production and manufacturing costs of such a related device. However, the sole direct use of a low-cost oscillator will degrade positioning device performance. Frequency search windows will become large and the search time for satellites will be longer if there is a large uncertainty in the reference clock. In the present solution, the frequency uncertainty associated with using a low-cost oscillator is greatly reduced. Positioning performance parameters, such as TTFF (time to first fix) can still be maintained while a more cost-effective oscillator is used.

The present invention uses these two oscillators in conjunction, applying a cross referencing technique in order to determine precise frequencies of clock signals from both oscillators. Upon knowing the precise frequencies, the oscillators can then be individually matched to each respective circuit, allowing for optimal performance in both the GPS and cellular/communications related circuitries. This eliminates the need for two high cost and high precision oscillators, thereby reducing production and manufacturing costs in GPS-cellular/communications integrated circuits.

A lower-cost oscillator generally possesses certain shortcomings, such as a high temperature coefficient or shift, and a large frequency variation. However, if a practical frequency of a low cost oscillator can be attained (through referencing with the other oscillator of known frequency), then uncertainties in the frequency variation can be accounted for and overcome in signal processing and adjustment.

Figure 3:
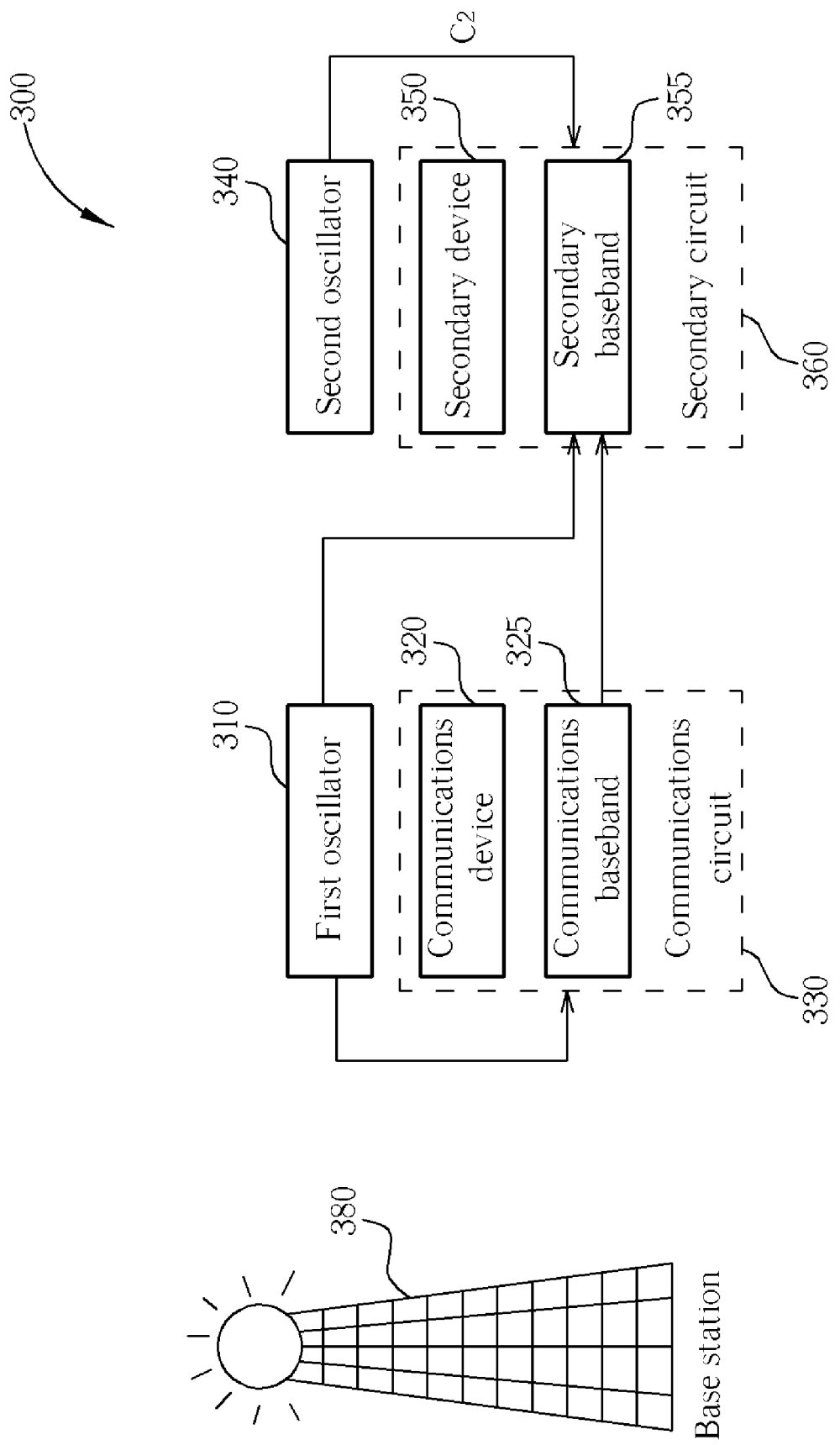
FIG. 3 illustrates a first embodiment of a communication-positioning system 300 using a low cost crystal according to the present invention.

FIG. 3 illustrates a first embodiment of the communications system 300 using a low cost crystal 340 according to the present invention. The apparatus includes a first oscillator 310, a second oscillator 340, and a secondary circuit 360. The secondary circuit 360 may further comprise a secondary device 350 and secondary baseband (BB) circuit 355. The first oscillator 310 is coupled to the secondary circuit 330 in order to provide a first clock signal $C_1$ having a first oscillation frequency $f_1$. Similarly, the second oscillator 340 is coupled to the secondary circuit 360 to provide a second clock signal $C_2$ having a second oscillation frequency $f_2$. The secondary circuit 360 could be a GPS tracking device, a Bluetooth device, or a cellular communications device amongst other options. In the following description, the first oscillator 310 is a more expensive crystal having a specific frequency $f_1$ with high tolerance, while the second oscillator 340 is a low cost crystal 340 for which the exact frequency $f_2$ may vary for example due to manufacturing uncertainties.

Operation of the system 300 is outlined in the following description. In this embodiment, the first frequency $f_1$ of the first oscillator 310 is known prior to initialization. This is the case for CDMA/GSM integrated circuits, as an operating clock frequency $f_1$ must be already determined through CDMA protocol if the first oscillator 310 is to supply a clock signal $C_1$ to CDMA circuitry. The clock frequency $f_1$ of the first oscillator 310 can then be provided to the secondary circuit 360 for later application. The secondary circuit 360 can now use this value ($f_1$) along with the clock signal $C_1$ of the first oscillator 310, and the clock signal $C_2$ of the second oscillator 340 to determine a frequency $f_2$ of the second clock signal $C_2$ outputted by the second oscillator 340.

Figure 4:
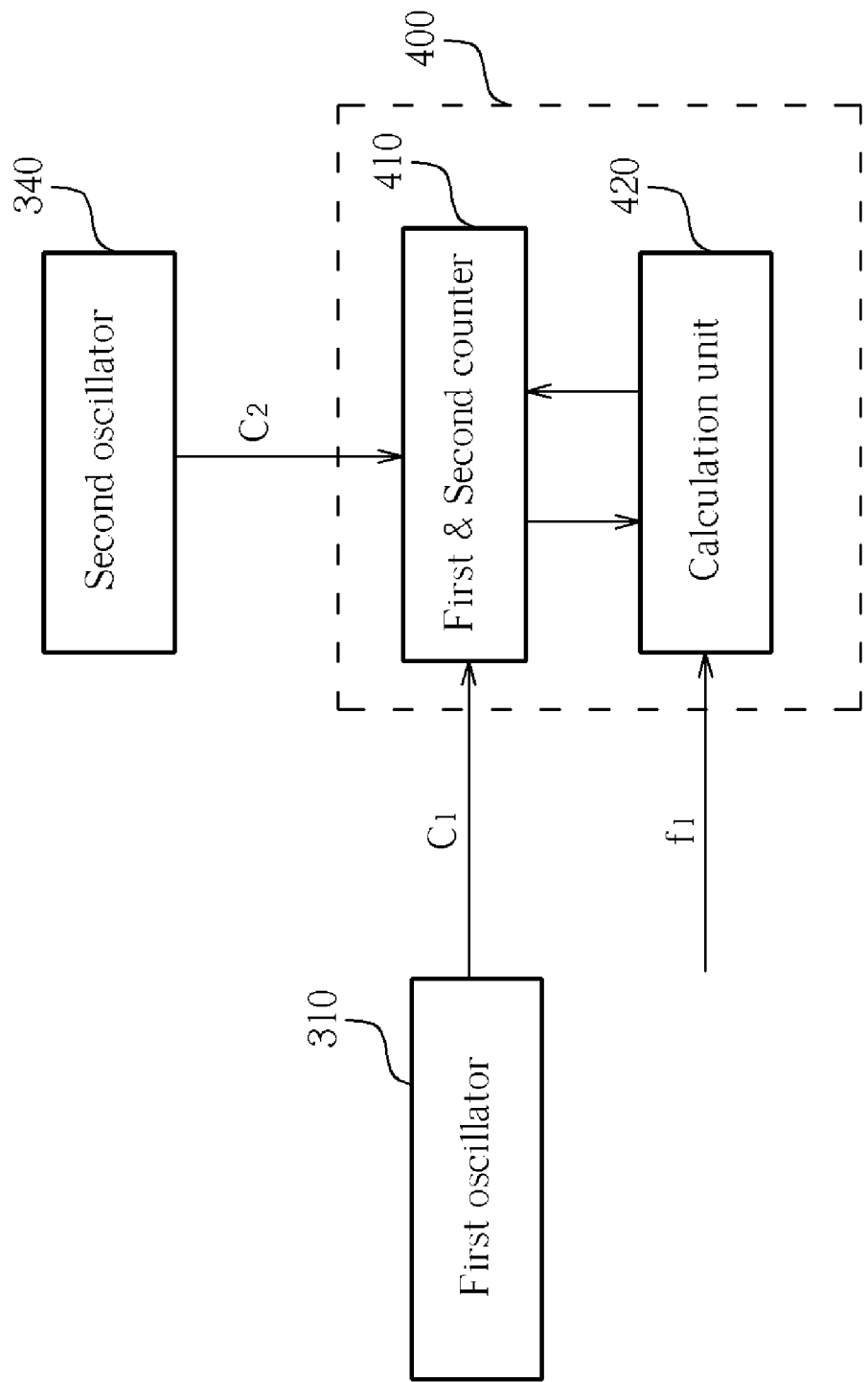
FIG. 4 illustrates an embodiment of a counting circuit 400 according to the present invention.

The specific determination of the second frequency $f_2$ is carried out through a counting and comparison process. FIG. 4 illustrates an embodiment of a counting circuit 400 used for performing the counting and comparison process. The counting circuit 400 may be located within the secondary circuit 360 for obtaining the second oscillation frequency ($f_2$) of the clock signal $C_2$ from second oscillator 340. The count and latch circuit 400 comprises first and second counter 410 being coupled to a calculation unit 420. The first and second counter 410 is additionally coupled to the first oscillator 310 for receiving the first clock signal $C_1$, and to the second oscillator 340 for receiving the second clock signal $C_2$.

Operation of the counting circuit 400 to determine the second oscillation frequency $f_2$ of the second oscillator 340 is described in the following. Upon initialization, the calculation unit 420 will possess the oscillating frequency ($f_1$) of the first oscillator 310. For example, the oscillating frequency $f_1$ may be predetermined and accurately known for the first oscillator 310. The first and second counter 410 then proceeds by counting the number of periods ($N_1$) of the first clock signal $C_1$ from the first oscillator 310 for a set duration. Each period can be identified by a rising edge, a peak, or a falling edge of the first clock signal $C_1$, which is periodic in nature. The set duration can also correspond to a predetermined number of periods (by fixing $N_1$ with a known value) of the first clock signal $C_1$, or vice versa.

For the same set duration, the first and second counter 410 also counts the number of periods ($N_2$) of the second clock signal $C_2$ from the second oscillator 340. Conversely, if fixing $N_1$ to a predetermined value (say $N_T$), first and second counter 410 will then also count $N_2$ until counting of $N_1$ has reached $N_T$. Upon knowing the oscillating frequency $f_1$ of the first oscillator 310 clock signal $C_1$, the number of latches ($N_1$) of the first oscillator 310 occurring in the set duration, and the number of latches ($N_2$) of the second oscillator 340 in the same set duration, one can apply the following equation to attain the oscillating frequency $f_2$ of the second clock signal $C_2$ from the second oscillator 340:

$$\frac{f_1}{f_2} = \frac{N_1}{N_2} \qquad (1)$$

Figure 6:
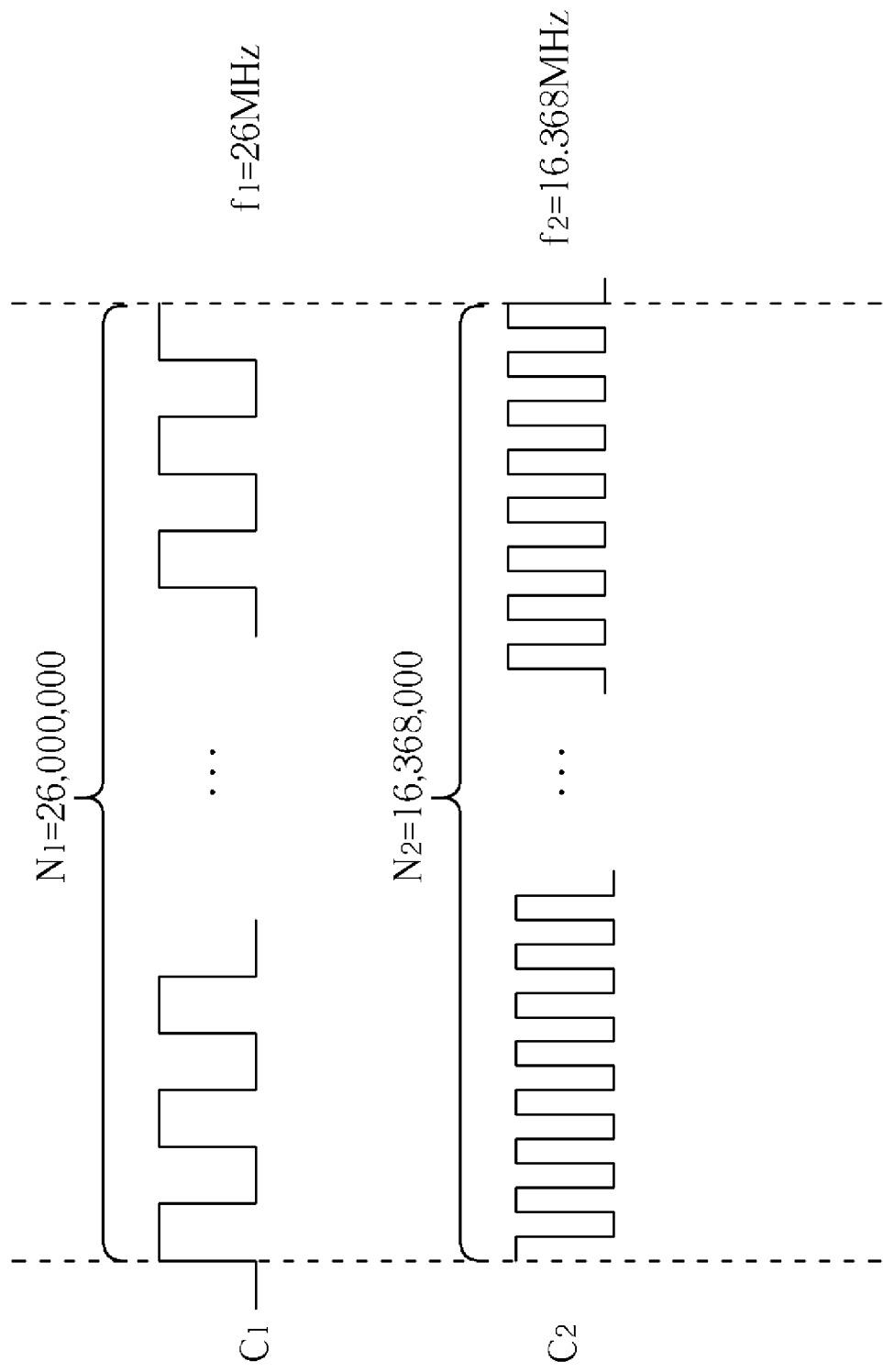
FIG. 6 illustrates counting a number of periods of the first and second clock signals by counting a number of peaks of the first and second clock signals within a duration according to an embodiment of the present invention.

FIG. 6 illustrates counting a number of periods of the first and second clock signals $C_1$, $C_2$ by counting a number of peaks of the first and second clock signals $C_1$, $C_2$ within duration according to an embodiment of the present invention. As an example illustrating the above, assume that an exact frequency of the first clock signal $C_1$ of the first oscillator 310 is determined to be ($f_1$=26 MHz), and $N_1$ is fixed to a value of ($N_1$=26,000,000 as shown in FIG. 6. The first and second counter 410 will then proceed to count every period of the first clock signal $C_1$ from the first oscillator 310 until a count of $N_1$=26,000,000 has been reached. At the same time, the first and second counter 410 will also count the periods of the second clock signal $C_2$ from the second oscillator 340 to record its number of latches $N_2$. When a count of $N_1$=26,000,000 has been reached for the first clock signal $C_1$ of the first oscillator 310, the first and second counter 410 will stop counting the clock signals $C_1$, $C_2$ of both the first oscillator 310 and the second oscillator 340 ($N_1$ and $N_2$). Using the current count of $N_2$, the calculation unit 420 can now apply eq. (1) to determine the second oscillating frequency $f_2$ of the second oscillator 340. For a numerical reference, if we assume a value of $N_2$=16,368,000 was attained in the previous step, one can easily deduce that the actual oscillating frequency $f_2$ of the second oscillator 340 clock signal $C_2$ corresponds to $f_2$=16.368 MHz. The maximum count error in this example will not exceed 1 count per second. Taking the 16.368 Mhz oscillator for example, an error of 1 count would mean a 0.06 ppm frequency error, which is small enough to ensure good positioning performance. Of course, the above numerical values are simply meant as an example, as other frequency ranges and values are also supported by the present invention.

In an alternate embodiment of the communications system 300, a communications circuit 330 is additionally coupled between the first oscillator 310 and the secondary circuit 360. The communications circuit 330 performs operations utilizing the first clock signal $C_1$ from the first oscillator 310, and communicates with a base station 380. The communications circuit may further comprise a communications device 320, and a communications baseband 325. When applied to cellular phone technology, the communications circuit 330 can represent the cellular phone, the communications device 320 being the cellular phone operating circuitry, the communications baseband 325 being the cellular baseband, and the base station 380 representing the cellular broadcast provider.

In the case of a cellular type integrated device, the exact frequency $f_1$ of the first clock signal from the first oscillator 310 may not be accurately known beforehand by the communications system 300. This is especially the case for GSM communications devices. The communications circuit 330 therefore performs a frequency scan in order to locate and begin synchronization with a transmitting base station 380. During the frequency scan, information such as the frequency $f_1$ of the first oscillator 310 is obtained from the handshaking and synchronization process. Generally speaking, a frequency error from the base station is under 0.01 ppm, with the accuracy requirement of the mobile clock after calibration being under 0.1 ppm. Therefore after synchronization, a precise value of the frequency $f_1$ of the first clock signal $C_1$ of the first oscillator 310 is obtained. Having obtained an exact frequency $f_1$ of the first oscillator 310 from the base station 380, the system 300 can now use this value along with the first clock signal $C_1$ of the first oscillator 310, and provide a reference for the second oscillator 340 for the communications system 300 similar to the above-described embodiment.

In this embodiment, the communications circuit 330 proceeds by providing the value of the oscillating frequency $f_1$ of the cellular first oscillator 310 to the secondary circuit 360. The first clock signal $C_1$ of the first oscillator 310 is also sent to the secondary circuit 360. The secondary circuit 360 receives both of these quantities in order to provide a reference for determining the frequency $f_2$ of the second clock signal $C_2$ of the second oscillator 340. The procedure for determining the frequency $f_2$ is analogous to the method described in the first embodiment above, and is therefore omitted to prevent redundancy. Obtaining a precise oscillating frequency $f_2$ of the second oscillator 340 will help ensure optimized performance for the secondary circuitry 360 of the communications system 300.

Typically, a higher cost, higher precision oscillator is utilized for the first oscillator 310 to operate in conjunction with the communications circuit 330. CDMA communications devices, for example, may require an oscillator of such precision where the clock signal frequency $f_1$ can be determined beforehand. One type of acceptable oscillator is a voltage-controlled and temperature-compensated oscillator (VCTCXO), where the oscillating frequency is controlled by a voltage input, and the oscillating frequency remains invariant with temperature fluctuations. However, this invention is not limited to this type of configuration. For example, additional embodiments (not shown) may also use an alternate configuration where a mid-range cost oscillator, with acceptable precision is used as the second oscillator 340. The method or apparatus above is then used to reduce the frequency uncertainty of $f_2$ to achieve better performance of the positioning system.

Although the communications circuit 330 of the communications system 300 presented above generally relates to cellular type devices, the present invention is in no way limited to this type of device. Other embodiments may include a Bluetooth communications device integrated with a GPS device as the secondary circuit 360 while still maintaining the principles taught above. Another embodiment may include the communications circuit 330 being a radio frequency (RF) device or a wireless transmission device. The specific choice of the communications circuit 330 does not limit the scope of the present invention in any way, bearing that the principles and teachings of present invention remain intact.

Figure 5:
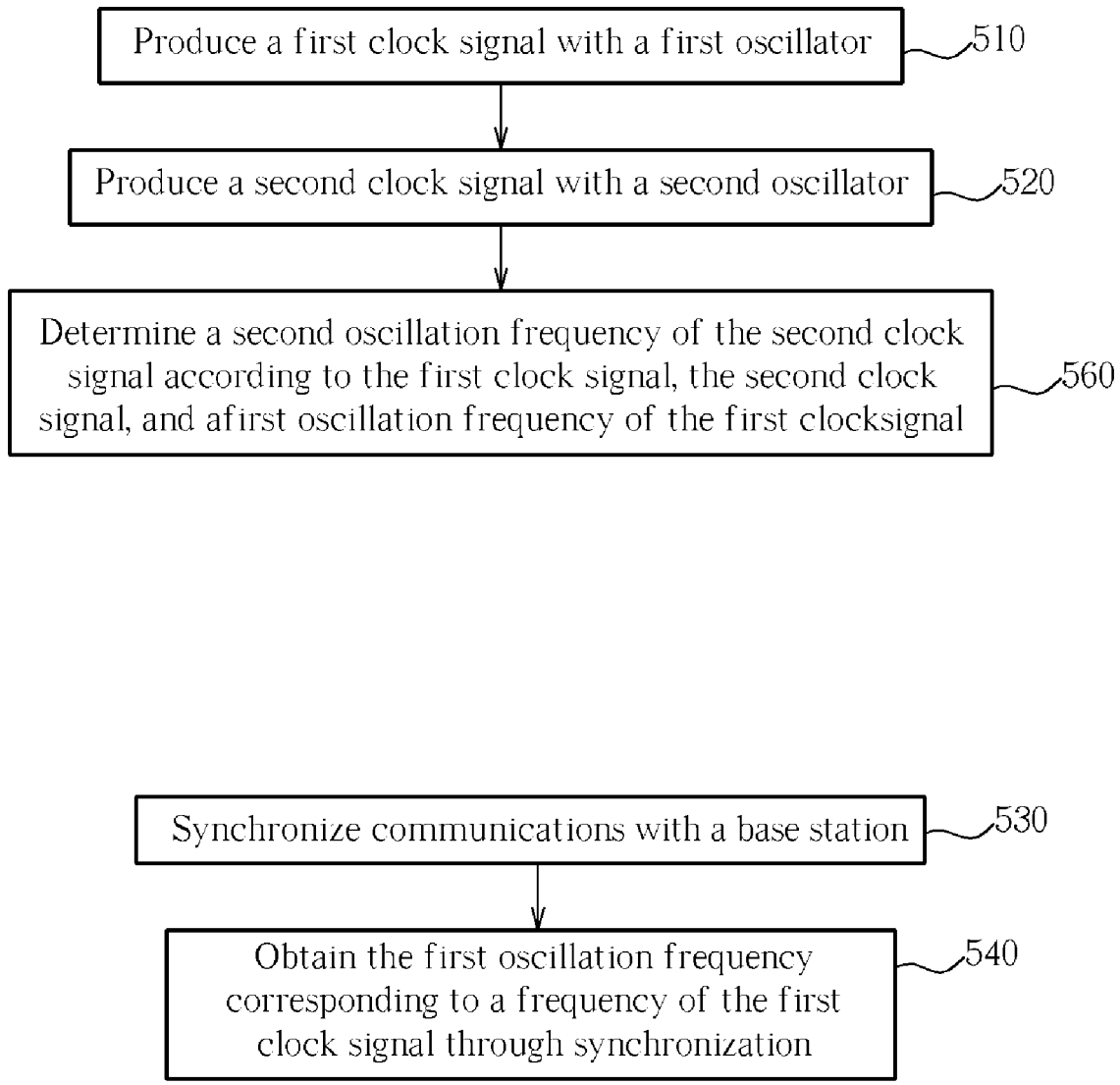
FIG. 5 illustrates a method for determining oscillation frequencies in a communication-positioning system using a low cost crystal according to an embodiment of the present invention.

FIG. 5 illustrates a method determining oscillation frequencies in a communications system using a low cost crystal according to an embodiment of the present invention. Provided that substantially the same result is achieved, the steps of the process 500 need not be in the exact order shown and need not be contiguous, that is, other steps can be intermediate. The method comprises:

Step 510: Produce a first clock signal utilizing a first oscillator.

Step 520: Producing a second clock signal utilizing a second oscillator.

Step 560: Determine a second oscillation frequency corresponding to a frequency of the second clock signal; the second oscillation signal being determined according to the first clock signal, the second clock signal, and a first oscillation frequency corresponding to a frequency of the first clock signal.

Additional embodiments (such as for application with GSM systems and cellular systems) may further include the following steps occurring prior to Step 560:

Step 530: Synchronize communications with a base station.

Step 540: Obtain the first oscillation frequency corresponding to a frequency of the first clock signal through synchronization.

Therefore through synchronization, a mobile unit counts a base station reference channel frame sync by using the first clock signal. The mobile then obtains the first clock error and adjusts the first clock to use an available frequency channel.

By utilizing two oscillators in conjunction with a cross referencing technique, the present invention provides a communications system capable of using a low cost crystal. This greatly reduces costs in manufacturing and production of a communications positioning integrated device, while providing better performance and accuracy of oscillating frequencies when compared to the prior art. The counting procedure described in the present invention allows for a precise oscillating frequency to be attained from one oscillator when the frequency of the other oscillator is determined.

Additionally, each oscillator is also individually matched to each respective circuit type, allowing for optimal performance in each the related circuits. Therefore, there is no need to share a single oscillator amongst the two circuits, and no need to mix or synthesize the frequencies, which can potentially introduce frequency and timing errors. Furthermore, this system provides an alternative to utilizing two high cost, high precision oscillators, thereby reducing production and manufacturing costs in communication-positioning integrated circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications system comprising:
   a first oscillator for producing a first clock signal;
   a second oscillator for producing a second clock signal; and
   a secondary circuit coupled to the first oscillator and the second oscillator for determining a second oscillation frequency corresponding to a frequency of the second clock signal; the second oscillation signal being determined according to the first clock signal, the second clock signal, and a first oscillation frequency corresponding to a frequency of the first clock signal;
   wherein the secondary circuit further comprises a calculation unit for determining the second oscillation frequency being the first oscillation frequency divided by a first number of periods of the first clock signal within a duration, and further multiplied by a second number of periods of the second clock signal within the duration.

2. The communications system of claim 1 wherein the secondary circuit further comprises:
   a first counter for counting the first number of periods by counting a number of cycles of the first clock signal within the duration; and
   a second counter for counting the second number of periods by counting a number of cycles of the second clock signal within the duration.

3. The communications system of claim 2 wherein the duration corresponds to a predetermined number of periods of the first clock signal as counted by the first counter, and the second counter is for counting the second number of cycles until the first counter has reached the predetermined number.

4. A communications system comprising:
   a first oscillator for producing a first clock signal;
   a second oscillator for producing a second clock signal; and
   a secondary circuit coupled to the first oscillator and the second oscillator for determining a second oscillation frequency corresponding to a frequency of the second clock signal; the second oscillation signal being determined according to the first clock signal, the second clock signal, and a first oscillation frequency corresponding to a frequency of the first clock signal;
   wherein the first oscillator has a first predetermined frequency being accurate within a first range, the second oscillator has a second predetermined frequency being accurate within a second range, and the first range is smaller than the second range.

5. The communications system of claim 4 wherein the frequency of the first oscillator is more accurately known through communication network calibration.

6. The communications system of claim 4 wherein the secondary circuit is a positioning circuit.

7. The communications system of claim 6 wherein the communications circuit is a code division multiple access communications circuit or a frequency division multiple access communications circuit.

8. A communications system comprising:
   a first oscillator for producing a first clock signal;
   a second oscillator for producing a second clock signal;
   a secondary circuit coupled to the first oscillator and the second oscillator for determining a second oscillation frequency corresponding to a frequency of the second clock signal; the second oscillation signal being determined according to the first clock signal, the second clock signal, and a first oscillation frequency corresponding to a frequency of the first clock signal; and
   a communications circuit coupled to the first oscillator and the secondary circuit, the communications circuit for synchronizing communications with a base station, and obtaining the first oscillation frequency corresponding to the frequency of the first clock signal determined through synchronization with the base station.

9. The communications system of claim 8 wherein the communications circuit is a GSM, TDS-DMA or Bluetooth communications circuit.

10. A method for determining oscillation frequencies in a communications system, the method comprising:
producing a first clock signal utilizing a first oscillator;
producing a second clock signal utilizing a second oscillator; and
determining a second oscillation frequency corresponding to a frequency of the second clock signal; wherein the second oscillation frequency is determined as a first oscillation frequency corresponding to a frequency of the first clock signal divided by a first number of cycles of the first clock signal within a duration, and further multiplied by a second number of cycles of the second clock signal within the duration.

11. The method of claim 10 further comprising:
counting the first number of periods by counting a number of cycles of the first clock signal within the duration; and
counting the second number of periods by counting a number of cycles of the second clock signal within the duration.

12. The method of claim 11 wherein the duration corresponds to a predetermined number of cycles of the first clock signal, and the second number of cycles is counted until the first number of periods has reached the predetermined number.

13. A method for determining oscillation frequencies in a communications system, the method comprising:
producing a first clock signal utilizing a first oscillator;
producing a second clock signal utilizing a second oscillator; and
determining a second oscillation frequency corresponding to a frequency of the second clock signal; the second oscillation signal being determined according to the first clock signal, the second clock signal, and a first oscillation frequency corresponding to a frequency of the first clock signal;
wherein the first oscillator has a predetermined frequency being accurate within a first range, the second oscillator has a second predetermined frequency being accurate within a second range, and the first range is smaller than the second range.

14. The method of claim 13 wherein the frequency of the first oscillator is more accurately known through communication network calibration.

15. The method of claim 13 further comprising coupling the second clock signal to a positioning circuit.

16. The method of claim 15 further comprising coupling the first clock signal to a code division multiple access communications circuit or a frequency division multiple access communications circuit.

17. A method for determining oscillation frequencies in a communications system, the method comprising:
producing a first clock signal utilizing a first oscillator;
producing a second clock signal utilizing a second oscillator;
determining a second oscillation frequency corresponding to a frequency of the second clock signal; the second oscillation signal being determined according to the first clock signal, the second clock signal, and a first oscillation frequency corresponding to a frequency of the first clock signal;
synchronizing communications with a base station; and
obtaining the first oscillation frequency corresponding to a frequency of the first clock signal through synchronization.

18. The method of claim 17 further comprising coupling the first clock signal to a GSM, TDS-DMA or Bluetooth wireless communication system.

* * * * *

UNITED STATES PATENT AND TRADEMARK OFFICE
CERTIFICATE OF CORRECTION

PATENT NO.      : 7,664,477 B2
APPLICATION NO. : 11/614068
DATED           : February 16, 2010
INVENTOR(S)     : Hsin-Chung Yeh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 535 days.

Signed and Sealed this

Twenty-eighth Day of December, 2010

David J. Kappos
*Director of the United States Patent and Trademark Office*